W. L. STEWART.
Wheel Cultivator.
No. 85,488. Patented Dec. 29, 1868.
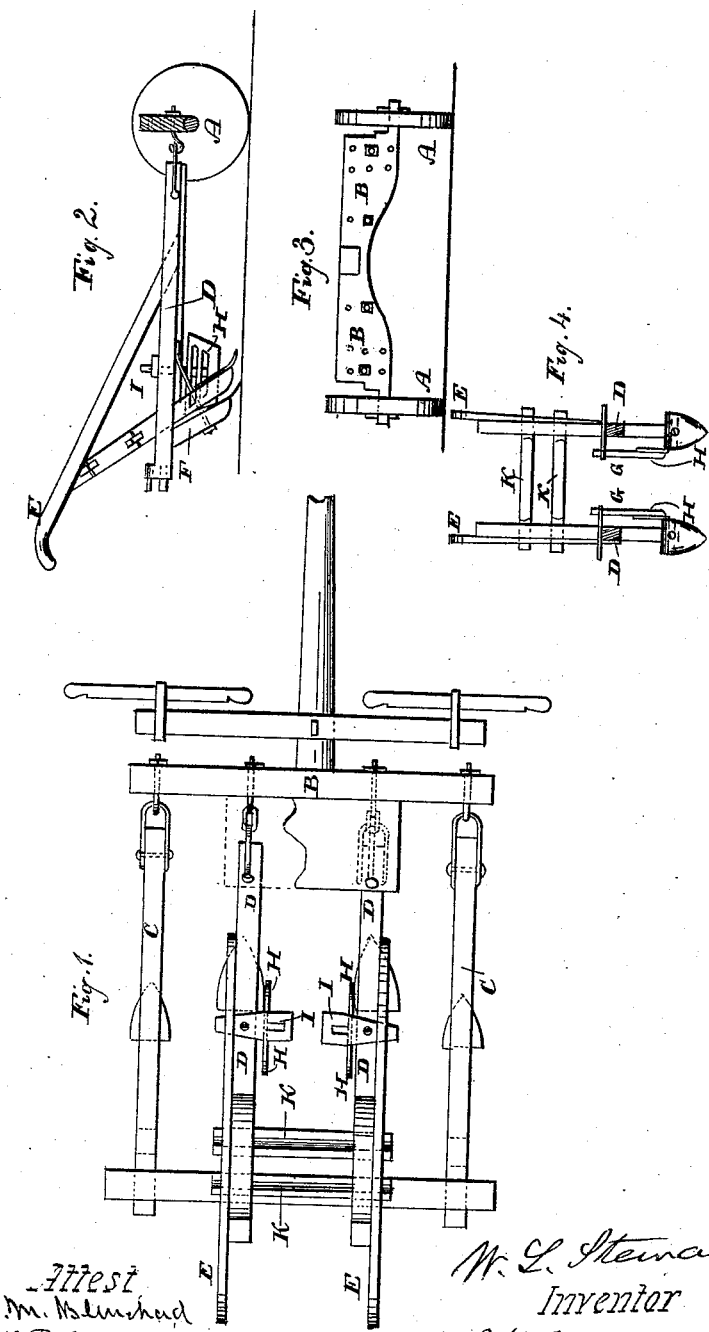

WILLIAM L. STEWART, OF RUSHVILLE, INDIANA.

Letters Patent No. 85,488, dated December 29, 1868.

IMPROVEMENT IN CULTIVATORS.

The Schedule referred to in these Letters Patent and making part of the same.

*To all whom it may concern:*

Be it known that I, WILLIAM L. STEWART, of Rushville, county of Rush, State of Indiana, have invented a new and useful Improvement in Cultivators or Truck-Wheel Plows; and I do hereby declare the following to be a full, clear, and exact description of the same, reference being had to the accompanying drawings, making a part of this specification, in which—

Figure 1 is a plan view of the cultivator and furrowing-attachment;

Figure 2 is a side elevation of the cultivator, detached from the furrowing-device.

Figure 3 is a front view, showing the arrangement by which the plow or shovel-beam may be raised or lowered; and Figure 4 is a rear-end view of the cultivator, detached from the furrowing-device.

Corresponding letters denote corresponding parts in the several figures.

The object of this invention is an improvement in cultivators or plows for cultivating crops of various kinds; and It consists, first, in the means hereinafter described for raising and lowering the forward ends of the beams to which the plows or shovels are attached; and, secondly, in a novel construction and arrangement of coulters to be used with said plows.

A A are wheels, which are mounted upon the axle B in the usual manner.

B is the axle, each end of which is prepared for the reception of the wheels, as clearly shown in fig. 3 of the drawings, while that portion of it which is between said wheels is of such depth vertically as to admit of its being perforated with vertical rows of holes, extending through a range of, say, ten inches, which holes are for the reception of the eye-bolts, to which the clevises upon the ends of the plow-beams are attached.

The object of the holes above referred to is to enable the operator to raise and lower the forward ends of the plow-beams, so as to cause the plows or shovels to enter the earth to a greater or less distance, according to the condition of the crop to be cultivated.

C C are the beams of the furrowing-plows, which are attached to the axle by means of an ordinary clevis, said beams extending rearward from said axle, a distance of four or five feet, more or less, where they are united by a cross-beam, of sufficient size to receive a tenon, formed on the rear end of said beams. These beams are placed at a distance of two feet each from the centre of the axle, and are consequently four feet apart, which is about the distance which rows of corn are usually planted from each other, but provision is made for changing the distance of these beams from each other, by having two or more rows of holes in the axle, so as to permit of the changing of the eye-bolt, by which they are drawn, and by having corresponding mortises in the cross-beam for regulating their rear ends, thus giving any required distance between the rows of the crops. Near the rear ends of these beams a downwardly-projecting beam is secured in the usual way, to which the shovels are attached.

D D are the beams of the cultivator proper, which are attached to the axle in the same manner as those above described, and may be raised and lowered in the same manner. These beams have the usual handles for guiding their sidewise movements, and they also have the usual downward and upwardly-extending arms upon their rear ends, to which the shovels are attached in the usual manner, and provision is made for varying their position from a vertical to an inclined one.

In addition to the above-enumerated usual provisions, these beams are provided with a socket or arm, I, with a mortise through it, which is attached thereto, at a point corresponding nearly with a line drawn vertically from the upper ends of the shovels attached thereto, or it may be at any suitable point on such beams, the office of these arms or sockets being to receive and hold the end of an upright shaft, G, to the lower end of which the coulters H are attached.

I I are the sockets above alluded to, which are secured to the beams by means of a bolt and nut, they having a series of holes in them, by which means they may be set so as to carry the coulter a greater or less distance from the plows.

G G are the vertical shafts which pass through the arms I I, and in which they are held by having a key driven therein by the side of each, by which means they may be secured in any position vertically that may be desired.

H H are coulters, formed of sheets of iron or steel, and secured to the lower ends of the shafts G G, by being bolted thereto, they having slots cut in them, in the direction of their length, so that they may be adjusted longitudinally, and their front or cutting-edges secured to any requisite distance in advance of the plow or shovel by the side of which they are arranged.

From the foregoing, and upon reference to the drawings, it will be seen that these coulters are capable of a vertical as well as a longitudinal adjustment, which fact will be found to be of great advantage when used in ground where much grass is growing with the crop.

K K are the spreaders, which are placed between the arms, to which the shovels of the cultivator are attached, and they are formed with rounded shoulders, so that as the said arms are raised from a vertical position, no resistance shall be offered.

From the foregoing description it will be seen that this device is capable of being used, first, as a furrower only, which may be done by detaching the cultivator therefrom; and secondly, as a cultivator only, by detaching the furrower therefrom; and thirdly, that it may be used as a combined furrower and cultivator by uniting the two parts to the axle at the same time.

The tongue, together with the devices for drawing this machine, are of usual construction, and need not be particularly described here.

Having thus described my invention,

What I claim, and desire to secure by Letters Patent, is—

1. The construction and arrangement of the axle B, by which means the front ends of the plow or shovel-beams are raised or lowered for the purpose of controlling the depth to which the shovels shall enter the earth.

2. The within-described construction of the coulters H H, for the purpose set forth.

3. The arrangement of the coulters with reference to the shovels of the cultivator, that is to say, with vertical and longitudinal adjustment with reference thereto, substantially as shown and described.

In testimony whereof, I have signed my name to this specification, in the presence of two subscribing witnesses.

WILLIAM L. STEWART.

Witnesses:
GEORGE B. SLEETH,
EDWARD H. M. PERRY.